United States Patent [19]

Jones et al.

[11] 4,082,527
[45] Apr. 4, 1978

[54] METHOD FOR TRANSFERRING HEAT FROM A GLASS MOLD

[75] Inventors: Stanley Peter Jones, Doncaster; William Ferguson Watson, Shrewsbury, both of England

[73] Assignee: Emhart Limited, England

[21] Appl. No.: 751,060

[22] Filed: Dec. 16, 1976

Related U.S. Application Data

[63] Continuation of Ser. No. 597,785, Jul. 21, 1975, abandoned.

[30] Foreign Application Priority Data

Jul. 22, 1974   United Kingdom ............... 32311/74

[51] Int. Cl.² ............................................. C03B 9/38
[52] U.S. Cl. ........................................ 65/83; 65/162; 65/319; 65/356; 165/104 F
[58] Field of Search ................. 65/161, 162, 319, 356, 65/83, 85; 165/96, 104 F

[56] References Cited

U.S. PATENT DOCUMENTS

| | | | |
|---|---|---|---|
| 3,242,974 | 3/1966 | Goulounes | 165/104 F |
| 3,810,747 | 5/1974 | Bork | 65/162 X |
| 3,902,550 | 9/1975 | Martin et al. | 165/104 F |

*Primary Examiner*—Arthur D. Kellogg
*Attorney, Agent, or Firm*—McCormick, Paulding & Huber

[57] ABSTRACT

A heat transfer system includes first and second surfaces which are at different temperatures. A bed of fluidizable material is provided in a cavity which is located between the first and second surfaces, and gas from a supply means is supplied to the cavity to form a fluidized bed from the fluidizable material and thereby to enable heat to be transferred between the first and second surfaces. Control means is provided for alternately forming and collapsing the fluidized bed in order to regulate the rate of transfer of heat between the first and second surfaces. The heat transfer system has particular application in the cooling of a forming mould in a glassware forming system.

6 Claims, 4 Drawing Figures

METHOD FOR TRANSFERRING HEAT FROM A GLASS MOLD

CROSS REFERENCE TO RELATED APPLICATION

The present application is a continuation application of Ser. No. 597,785 filed July 21, 1975 now abandoned which is related to U.S. Patent Application Ser. No. 597,784, filed July 21, 1975, now U.S. Pat. No. 4,009,017 in the name of Stanley Peter Jones, both applications being assigned to the same assignee.

BACKGROUND OF THE INVENTION

In a conventional I.S. glassware forming machine, glassware forming moulds are cooled by blowing air at the outer surfaces of the moulds. However, it has been found that this method of cooling is difficult to control and is extremely noisy. In more refined systems, air has been ducted to the moulds and has been discharged at the mould surfaces from short-range, i.e. from a distance of 1 inch or less. Although such systems show a slightly improved efficiency and slight reductions in noise levels, the noise levels are still very high. Water cooling has been tried in an effort to overcome the problem of noise, but although water cooling is almost completely silent, cooling has been found to be too severe and attempts to reduce the cooling by reducing the rate of flow of the cooling water have resulted in boiling of the water and loss of control. Hence, water cooling is limited in practice to the cooling of items such as press plungers.

SUMMARY OF THE INVENTION

It is an object of the invention to provide an improved system for transferring heat. It is an object of a preferred embodiment of the invention to provide an improved cooling means for a glassware forming system.

According to the present invention, there is provided a heat transfer system comprising first and second surfaces at different temperatures, a bed of fluidizable material in a cavity between the first and second surfaces, supply means for supplying gas to the cavity to form a fluidized bed from the fluidizable material and thereby to enable heat to be transferred between the first and second surfaces, and control means for alternately forming and collapsing the fluidized bed whereby the rate of transfer of heat between the first and second surfaces may be regulated.

The control means in the heat transfer system may comprise timing means for operating a valve so that gas is supplied to the cavity for predetermined periods of time separated by predetermined intervals. Alternatively the control means may comprise a temperature responsive device for causing a valve to switch the supply of gas to the cavity on or off in accordance with the relationship of the temperature of one of the first and second surfaces to a predetermined temperature.

Although the use of a fluidizable bed as a thermal switch in a heat transfer system will be specifically described in relation to the cooling of glassware forming moulds, the use of a fluidizable bed as a thermal switch is not restricted to use in the cooling of glassware forming moulds, or even to cooling systems at all.

For example, the fluidizable bed may be employed in a system in which one of the first and second surfaces is the surface of an article to be heated, the other of the surfaces being at a higher temperature. If the control means comprises a temperature responsive device for monitoring the temperature of the article to be heated, the heat transfer system enables the article to be heated to a desired temperature and to be maintained at that temperature.

When the fluidizable bed is fluidized, the rate of transfer of heat through the bed is very high, but when the bed is not fluidized it acts virtually as an insulator. Collapsing of the fluidized bed therefore provides a substantially instantaneous cut-off in the transfer of heat from the hotter of the two surfaces to the cooler of the two surfaces.

More specifically in accordance with the present invention there is provided a glassware forming system including a forming mould and cooling means for removing heat from the forming mould, the cooling means comprising a cooling chamber spaced from an external surface of the forming mould by a cavity which contains fluidizable material, means for circulating a cooling fluid such as water through the cooling chamber, means for supplying gas to the cavity in order to form a fluidized bed from the fluidizable material within the cavity and thereby to enable heat to be transferred from the mould to the cooling fluid, and control means for controlling the gas supplied to the cavity for alternately forming and collapsing the fluidized bed in the cavity, whereby the rate at which heat is transferred from the mould to the cooling fluid may be regulated.

It is preferred for the cooling fluid to be water, although other cooling fluids may be used and in some cases the cooling fluid could be a gas. Associated with the cooling means is a source of gas, preferably air, under pressure for fluidizing the fluidizable bed of solid particles. The solid paticles are preferably iron shot having a mean diameter of the order of 0.008 inches, but other suitable materials, for example, graded sand, glass ballotini or brass shot, may be used instead of iron shot to form the fluidizable bed.

The control means may include a timing device for operating a valve to cause the fluidized bed to be formed at predetermined intervals for predetermined periods of time. The timing device may be coupled to the cycle of operation of the glassware forming machine or the timing device may alternatively operate on a cycle dependent upon the heat transfer rate required but independent of the cycle of operation of the glassware forming machine, in which case the thermal inertia of the body of the forming mould provides a heat reservoir to compensate for lack of synchronisation between the cycle of the timing device and the cycle of operation of the glassware forming machine.

it is preferred for the timing device to operate to cause the fluidized bed to be formed only during a predetermined part or predetermined parts of each cycle of operation of the glassware forming machine. The timing device may, therefore, be part of the timing drum of a conventional I.S. glassware forming machine used in conjunction with conventional mechanically operated valves, or the timing device may be electronic timing coupled with solenoid valve means.

The control means may alternatively include a temperature sensing element mounted in a selected part of the forming mould and means for controlling the supply of gas to the cavity in accordance with signals received from the temperature sensing element. The means for controlling the supply of gas preferably comprises solenoid valve means.

Further in accordance with the present invention, there is provided a glassware forming system including a pair of similar mould sections which together constitute a forming mould, each mould section comprising a forming surface defining a part of an external surface of glassware to be moulded therein, a rear surface through which heat from the glassware is to be dissipated, a member which is arranged to be cooled by the circulation of a cooling fluid, a fluidizable bed of solid particles in a cavity between the rear surface and the member, means for supplying gas to the cavity in order to form a fluidized bed from the solid particles, and control means for selectively interrupting the supply of gas to the cavity whereby the fluidized bed may be collapsed at intervals and the rate of heat transfer from the rear surface of the mould section to the said member may be varied.

BRIEF DESCRIPTION OF THE DRAWINGS

In the drawings.

In the drawings the same or similar parts are designated by like reference numerals.

DETAILED DESCRIPTION

Figure 1:
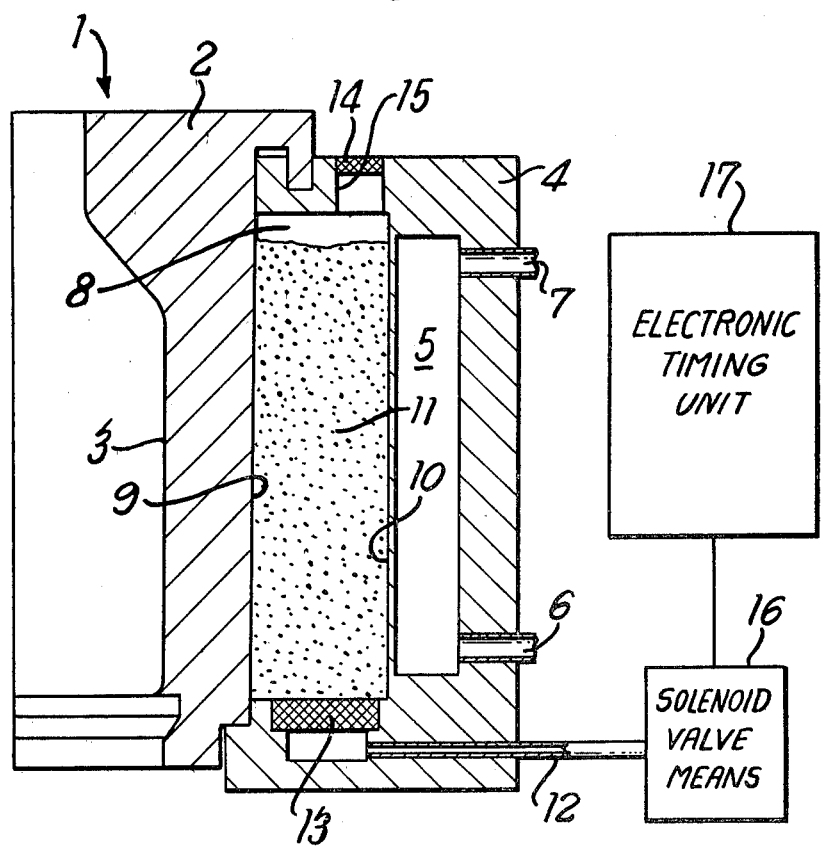
FIG. 1 is a cross-section through a blow mould section for use in a glassware forming system showing a timing unit and valve means associated therewith.

A blow mould section 1 comprises a metal block 2 which has a pair of machined glassware forming surfaces 3. A pair of blow mould sections is mounted at each final forming station in an I.S. glassware forming machine, and the forming surfaces 3 co-operate with similar forming surfaces on a second blow mould section to define the external configuration of glassware to be formed.

A water-cooled member 4 is attached to the metal block 2 on the side remote from the forming surfaces 3, and the water-cooled member 4 includes a cooling chamber 5 into which cooling water is passed through inlet pipes 6. Water flows out of the cooling chamber 5 through outlet pipes 7.

A cavity 8 is provided between a rear surface 9 of the metal block 2 and a front surface 10 of the water-cooled member 4. The cavity 8 is almost filled with a bed 11 of fluidizable material. The material which comprises the fluidizable bed 11 has a high density and a high heat capacity, is stable at the operating temperature, and is of a particle size suitable for fluidization. Suitable materials are brass or iron shot. It is preferred to use iron shot which has a mean diameter of the order of 0.008 inches.

Fluidizing gas, which is preferably compressed air, is introduced into the cavity 8 through a gas supply pipe 12 and a porous diffusing member 13. The diffusing member 13 may be porous ceramic material, porous metal or wire mesh clamped between plates. The diffusing member 13 should offer a total resistance to air flow which is several times the resistance to air flow of the bed 11 in its fluidized condition, in order to provide a uniform distribution of air across the bed and thereby produce uniform fluidization. It has been found to be advantageous for the ratio of the resistance to air flow of the diffusing member 13 to the resistance to air flow of the bed 11 in its fluidized state, to be between 2:1 and 6:1. Air is passed through the diffusing member 13 at a rate between about two and about five times the minimum rate required to produce fluidization of the bed 11. Minimum fluidization velocities for air for particles of the order of 0.008 inches in diameter are less than 1 foot per second. Air passing up through the bed 11 passes out from the cavity 8 through a retaining gauze 14 which is releasably mounted in an opening 15 in the top of the water-cooled member 4.

In operation of the glassware forming system, when water is circulated through the cooling chamber 5 and the bed 11 is fluidized by passing air through the gas supply pipe 12, heat from the forming surfaces 3 which are in contact with molten glass during forming passes from the metal block 2 through the rear surface 9 and is transferred to the water in the cooling chamber 5 by the fluidized bed 11. So long as the bed 11 is fluidized, the rate of transfer of heat from the forming surfaces 3 to the water in the cooling chamber 5 is very high, but when the bed 11 is not fluidized, the forming surfaces 3 are virtually insulated from the water in the cooling chamber 5. It is therefore possible to regulate the rate at which heat is transferred from the forming surfaces 3 by varying the proportion of time for which the bed 11 is fluidized.

Accordingly, solenoid valve means 16 is associated with the blow mould 1 to switch the air flow through the gas supply pipe 12 on and off according to a predetermined schedule. The solenoid valve means 16 is operated by an electronic timing unit 17.

Although it is preferred to use solenoid valve means in conjunction with electronic timing, it is possible to use mechanical valve means operated by the timing drum in a conventional I.S. glassware forming machine.

Figure 2:
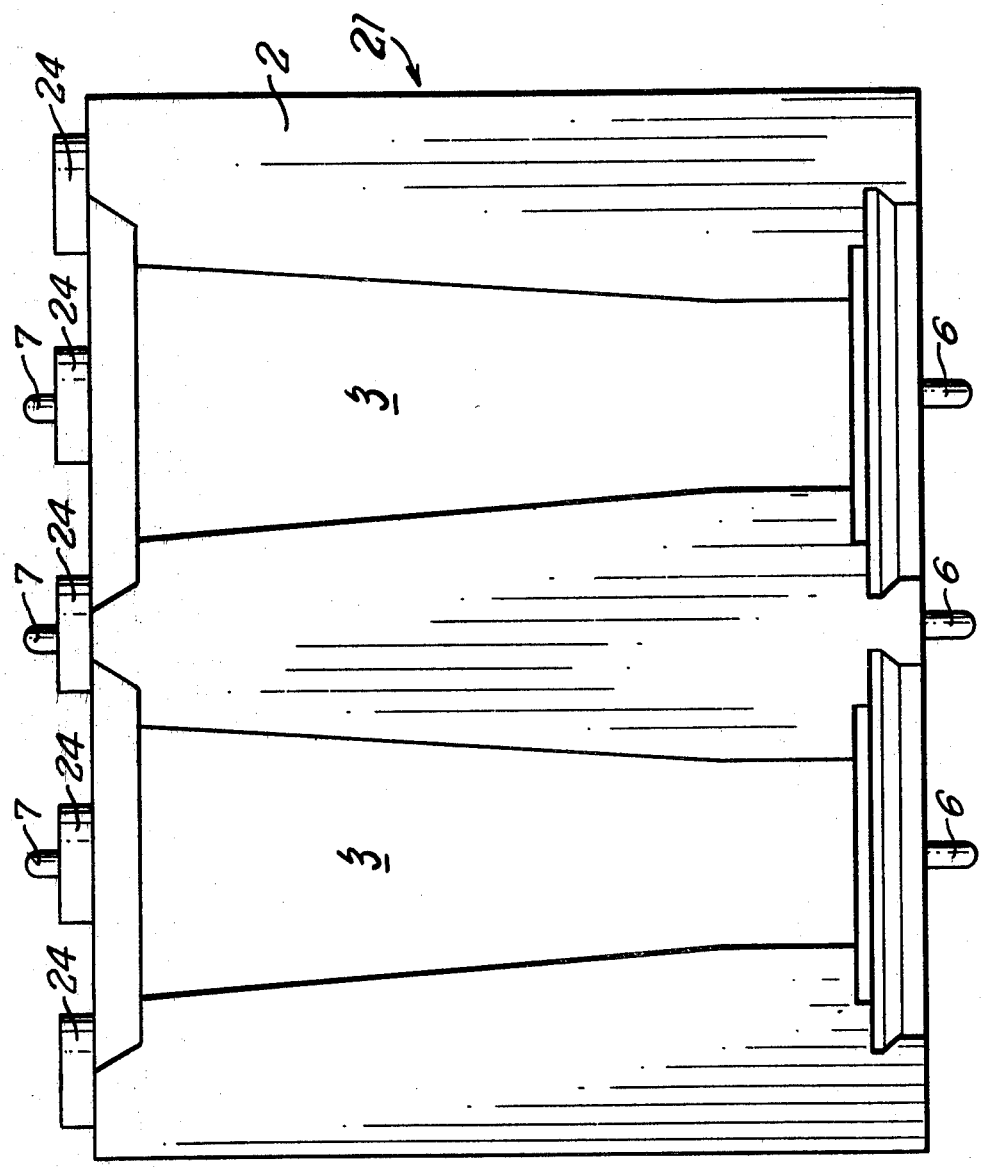
FIG. 2 is a front elevation of a blank mould section for use in a glassware forming system, the elevation being of the mould section of FIG. 3, viewed from the left in that Figure.
Figure 3:
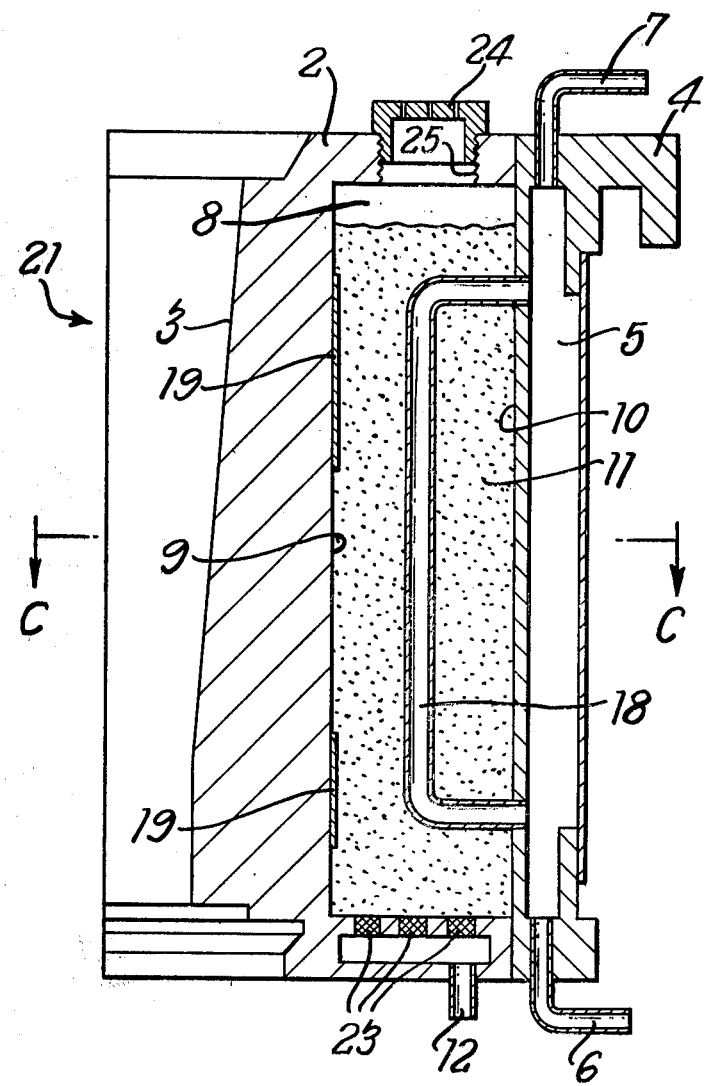
FIG. 3 is a cross-section through the blank mould section of FIG. 2 taken along the lines B—B of FIG. 4.
Figure 4:
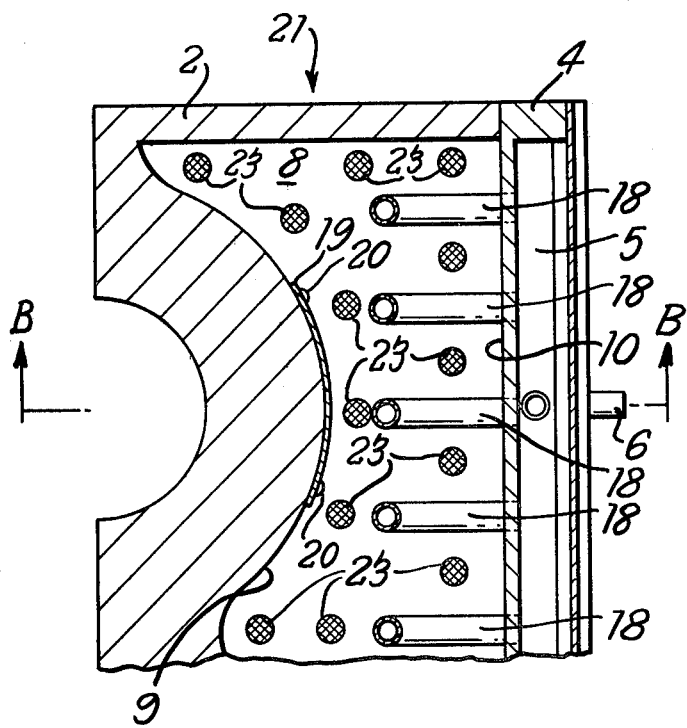
FIG. 4 is a cross-section through the blank mould section of FIGS. 2 and 3 taken along the lines C—C of FIG. 3 and with the fluidizable bed not present.

In FIGS. 2 to 4 of the drawings, there is shown a blank mould section 21. Those parts of the blank mould section 21 which are similar to parts of the blow mould 1, have the same reference numerals. A pair of blank mould sections is mounted at each blank forming station in an I.S. glassware forming machine and the forming surfaces 3 co-operate with similar forming surfaces on a second blank mould section to define the external configuration of parisons to be formed.

The blank mould section 21 differs from the blow mould section 1 in that porous discs 23 are provided in place of the diffusing member 13. However, the porous discs 23 are of the same material as the diffusing member 13 and present the same resistance to air flow as the diffusing member 13. In place of the retaining gauze 14 in the opening 15 in the top of the water-cooled member 4, porous metal caps 24 for allowing air passing up through the bed 11 to escape from the cavity 8 are threadedly mounted in holes 25 in the top of the metal block 2.

The effective surface area of the front surface 10 of the water-cooled member 4 is increased in the embodiment of FIGS. 2 to 4 by providing additional cooling pipes 18 which extend from the cooling chamber 5 and pass through the bed 11. Similar cooling pipes may be provided in the blow mould section 1. The effective surface area of the front surface 10 in either the blow mould section 1 or the blank mould section 21 may alternatively be increased by the provision of solid fins or water-cooled fins extending into the bed 11. Similarly the effective surface area of the rear surface 9 of the metal block 2 may be increased, and hence the rate of flow of heat into the fluidized bed 11 may be increased, by the provision of solid fins extending from the metal block 2 into the bed 11.

If it is desired to restrict the flow of heat into the fluidized bed 11 from specific parts of the forming surfaces 3, shielding plates 19 may be mounted within the cavity 8 adjacent to the rear surface 9 and between the bed 11 and parts of the forming surfaces 3. The shielding plates 19 are preferably made of metal and may be attached to the metal block 2 in a known manner, for example by bolts 20. The insulating effect of the shielding plates is increased by the inclusion of an insulating medium, for example asbestos paper, between the shielding plates 19 and the rear surface 9.

As an alternative to providing valve means which is operative to switch the supply of air to the bed 11 on and off in accordance with a predetermined time schedule, a temperature sensing element may be mounted in a selected part of the metal block 2, on one of the forming surfaces 3, or on the rear surface 9 of the metal block 2, and valve means may be provided for switching the supply of air through the gas supply pipe 12 on and off in accordance with signals received from the temperature sensing element.

It is an advantage of the preferred embodiments of the present invention that the cooling of the forming surfaces is very uniform since all parts of the fluidized bed are at a substantially uniform temperature.

Since the rate at which heat is transferred from the forming surfaces depends directly upon the proportion of time for which the fluidizable bed is fluidized, a more precise degree of control of the rate of transfer of heat is possible with the preferred embodiments of the invention described as compared with known forming moulds.

The cooling system in the preferred embodiments of the invention described has the further advantage that it is virtually silent in operation.

Most of the heat transferred from the forming surfaces of the preferred embodiments of the invention which have been described is transferred to the water passing through the cooling chamber, and only a small proportion of the heat is absorbed by the air which is used to fluidize the fluidizable bed. This results in a greatly improved working environment around the glassware forming machine, since the heat transferred to the cooling water is dissipated outside the factory.

In the embodiments of the invention which have been described, the fluidized bed operates as a thermal switch which controls the rate of cooling of the glassware forming mould. Operation of a fluidized bed in a similar manner will provide a thermal switch for use in controlling the rate of heating or the rate of cooling of a body in any process of manufacture or any treatment process where a controlled transfer of heat is required.

We claim:

1. In a cyclic system for forming glassware in a forming mould the improvement comprising:
   a. providing a fluidized bed in a cavity having a first surface defined by the mould and a second surface spaced from the first surface,
   b. altering the temperature of said second surface by circulating a cooling fluid through a chamber adjacent said second surface,
   c. alternately collapsing and restoring said fluidized bed by selectively supplying gas to said cavity whereby the rate of transfer of heat between said first and second surfaces is regulated.

2. The method of operating a cyclic glassware forming system according to claim 1 wherein said gas supply to said bed is successively shut off and turned on to collapse and restore the bed respectively.

3. The method of operating a cyclic glassware forming system according to claim 2 wherein said gas supply on/off control is achieved by varying the relative proportion of on and off time for said gas supply within the cycle time of the system.

4. The method of operating a cyclic glassware forming system according to claim 2 further characterized by sensing the temperature of the mould, and varying the relative proportion of on and off time for said gas supply in response to the difference between said sensed temperature and a predetermined temperature.

5. The method of operating a cyclic glassware forming system according to claim 1 further characterized by providing an electronic timing unit and solenoid valve means for said gas supply control, and switching said valve means on and off in accordance with a predetermined schedule.

6. The method of operating a cyclic glassware forming system according to claim 2 further characterized by shielding selected areas of said first surface to inhibit the rate of heat transfer to said fluidized bed in these areas even when the gas supply is on to fluidize the bed.

* * * * *

UNITED STATES PATENT OFFICE
CERTIFICATE OF CORRECTION

Patent No. 4,082,527                     Dated April 4, 1978

Inventor(s) Stanley Peter Jones and William Ferguson Watson

It is certified that error appears in the above-identified patent and that said Letters Patent are hereby corrected as shown below:

Assignee: "Emhart Limited, England" should read:

--Emhart (U.K.) Limited, England--

Col. 2, line 35, "paticles" should be --particles--.

Col. 2, line 53, "it" should be --It--.

Col. 6, line 40, "1" should be --2--.

Signed and Sealed this

Eighth Day of August 1978

[SEAL]

Attest:

RUTH C. MASON
Attesting Officer

DONALD W. BANNER
Commissioner of Patents and Trademarks